United States Patent Office 3,336,334
Patented Aug. 15, 1967

3,336,334
SELECTED 2,2-BIS(HYDROCARBYLOXY AND HYDROCARBYLTHIO) - 4 - HEXAFLUOROISOPROPYLIDENE-1,3-DITHIETANES
Maynard S. Raasch, Fairfax, Del., assignor to E. I. du Pont de Nemours and Company, Wilmington, Del., a corporation of Delaware
No Drawing. Filed Sept. 28, 1964, Ser. No. 399,900
16 Claims. (Cl. 260—327)

ABSTRACT OF THE DISCLOSURE

Selected 4 - hexafluoroisopropylidene - 2,2 - disubstituted - 1,3 - dithietanes, e.g., 2 - [2,2,2 - trifluoro - 1-(trifluoromethyl) - ethylidine] - 1,3,5,8 - tetrathiospiro-[3.4]octane, useful as textile-treating agents, particularly for waterproofing wool, and their preparation from bis-(trifluoromethyl)thioketene and selected thiocarbonyl compounds, e.g., ethylene trithiocarbonate.

Description of the invention

This invention relates to, and has as its principal objects provision of, novel fluorinated 1,3-dithietanes and a method for preparing these compounds.

The new products of this invention are 4-hexafluoroisopropylidene - 2,2 - disubstituted - 1,3 - dithietanes of the general formula

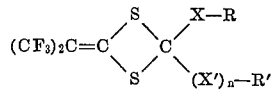

where X and X' are oxygen or sulfur; n is 0 or 1; R and R' individually are 1 to 18 carbon alkyl, alkenyl or carboxyalkyl; cycloalkyl of 5 to 6 ring carbons; 7 to 8 carbon aralkyl; or 1 to 2 ring aryl having from 0 to 2 substituents which can be halogen, lower alkyl, lower alkoxy or nitro; and R and R' together are a divalent alkylene group forming a 5 to 7 membered ring with the two heteroatoms and the dithietane carbon, or are the o-phenylene group.

These products are prepared by reacting, at temperature in the range of —20 to 50° C., bis(trifluoromethyl)thioketene with a thiocarbonyl compound of the formula

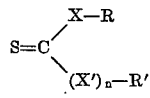

where X, X', n, R and R' have the previously stated significance. The reaction is represented by the equation

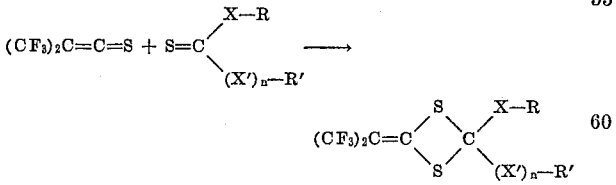

In naming the compounds of this invention, the fluorinated group in the 4-position of the 1,3-dithietane can be called 2,2,2-trifluoro-1-(trifluoromethyl)ethylidene, according to accepted rules. A shorter, definitive but unofficial name for this group is hexafluoroisopropylidene. Both nomenclatures are used in this discussion.

One of the starting materials used in the process of this invention, bis(trifluoromethyl)thioketene, is a new compound described and claimed in my U.S. Patent 3,275,609. Detailed procedure for preparing the compound is given in the patent.

The other starting material is a thiocarbonyl compound of the general formula set forth above. These thiocarbonyl compounds are of five main types:

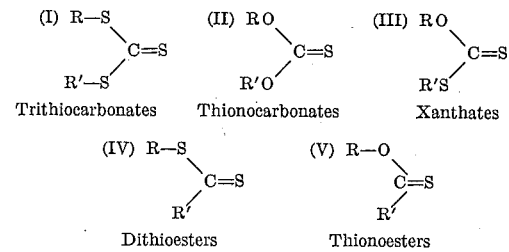

Known compounds of these types are listed by Reid, Organic Chemistry of Bivalent Sulfur, vol. IV (1962).

The reaction of bis(trifluoromethyl)thioketene with the thiocarbonyl compound can take place at low temperature, e.g., —20° C. There is no advantage, and it is sometimes undesirable, to exceed a temperature of about 50° C. The preferred temperature range is 0–50° C. When the thiocarbonyl compound is a liquid, the reactants may be combined in the presence or absence of a solvent. When the thiocarbonyl compound is a solid, it is convenient to dissolve it in a non-reactive solvent such as a hydrocarbon or halogenated hydrocarbon. Examples of suitable solvents are n-hexane, cyclohexane, benzene, toluene, dichloromethane, carbon tetrachloride, dichlorotetrafluoroethane, 1,1,2 - trichloro-1,2,2-trifluoroethane, chlorobenzene, and the like.

The relative proportions of the two reactants are not critical, as the reaction will proceed regardless of what they are. As a matter of convenience, approximately equimolar amounts are normally used, but an excess of one or the other reactant, particularly bis(trifluoromethyl)thioketene, can be employed.

The reaction product is isolated by any convenient method, such as removal of the solvent, if any is used, and recovery of the product by distillation or by crystallization from an appropriate solvent.

Embodiments of the invention

There follow some nonlimiting examples illustrating the invention in more detail. In these examples, temperatures are 10–25° C. and pressures are ambient unless otherwise noted.

EXAMPLE 1

*2-[2,2,2-trifluoro-1-(trifluoromethyl)ethylidene]-1,3,5,8-tetrathiospiro[3.4]octane*

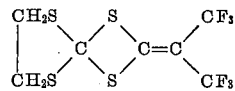

Bis(trifluoromethyl)thioketene was added to an equimolar amount of ethylene trithiocarbonate dissolved in dichloromethane. The solvent was allowed to evaporate and the crystals were recrystallized from methanol to give an 87% yield of white product, M.P. 85.5–86.5° C.

*Analysis.*—Calc'd. for C₇H₇F₆S₄: C, 25.44; H, 1.22; S, 38.83. Found: C, 25.72; H, 1.26; S, 38.90.

In agreement with the symmetry of the assigned structure, the F¹⁹ and the H¹ nuclear magentic resonance spectra are singlets. The compounds of the following examples also show singlets in the F¹⁹ spectrum.

EXAMPLE 2

*2,2-dimethoxy-4-[2,2,2-trifluoro-1-(trifluoromethyl) ethylidene]-1,3-diethietane*

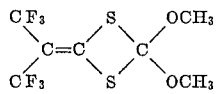

Equimolar amounts of bis(trifluoromethyl)thioketene and dimethyl thionocarbonate were mixed and allowed to stand at about 0° C. The product crystallized and was recrystallized from hexane to give 73% yield of the white dithietane, M.P. 50–51° C. An analytical sample was recrystallized again from carbon disulfide.

*Analysis.*—Calc'd. for C₇H₆F₆O₂S₂: C, 28.00; H, 2.01; S, 21.36. Found: C, 28.31; H, 2.45; S, 21.42.

EXAMPLE 3

*2,2-diphenoxy-4-[2,2,2-trifluoro-1-(trifluoromethyl) ethylidene]-1,3-dithietane*

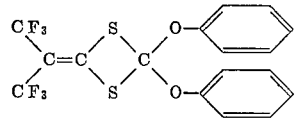

Diphenyl thionocarbonate was dissolved in dichloromethane (2 ml./g.) and an equimolar amount of bis(trifluoromethyl)thioketene was added. The solution was let stand for 16 hours and the solvent was then allowed to evaporate. The product was recrystallized by dissolving in methanol and cooling in Dry Ice. A 78% yield of the dithietane was obtained, M.P. 42–42.5° C.

*Analysis.*—Calc'd. for C₁₇H₁₀F₆O₂S₂: C, 48.11; H, 2.38; S, 15.11. Found: C, 48.20; H, 2.32; S, 15.12.

The infrared spectrum shows absorption at 6.15μ for the exocyclic double bond.

EXAMPLE 4

*2-methoxy-2-methylthio-4-[2,2,2-trifluoro-1-trifluoromethyl)ethylidene]-1,3-dithietane*

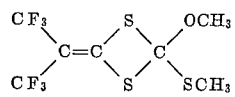

When bis(trifluoromethyl)thioketene was added to an equimolar amount of methyl methylxanthate, CH₃OCSSCH₃, the former was decolorized through formation of the colorless, liquid dithietane. The dithietane could not be distilled as heat dissociated it back into its components.

EXAMPLE 5

*4'-[2,2,2-trifluoro-1-(trifluoromethyl)ethylidene]spiro [1,3-benzodithiole-2,2'-[1,3]dithietane]*

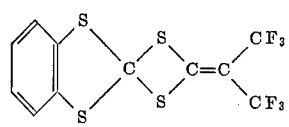

To o-phenylene trithiocarbonate (Huntley and Smiles, J. Chem. Soc., 1926, 1821) suspended in five times its weight of dichloromethane was added 1.3 molar equivalents of bis(trifluoromethyl)thioketene. The yellow solid dissolved by reaction. The solution was filtered and cooled in Dry Ice. The white crystals that separated were filtered off and rinsed with dichloromethane that had been cooled in Dry Ice. The yield of product was 96%. Its melting point could not be determined as it dissociated to its components when heated.

EXAMPLE 6

*2-ethylthio-2-methyl-4-[2,2,2-trifluoro-1-(trifluoromethyl)ethylidene]-1,3-dithietane*

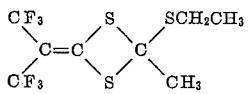

To ethyl dithioacetate diluted with twice its weight of dichloromethane was added an equimolar amount of bis(trifluoromethyl)thioketene. Occasional cooling in ice was employed as addition proceeded. The solvent was boiled off and the product was distilled to give a 95% yield of the colorless dithietane, B.P. 44° C./0.2 mm..

*Analysis.*—Calc'd. for C₈H₈F₆S₃: C, 30.57; H, 2.57; S, 30.61. Found: C, 31.11; H, 2.84; S, 30.62.

EXAMPLE 7

*2-(carboxymethylthio)-2-ethoxy-4-[2,2,2-trifluoro-1-(trifluoromethyl)ethylidene]-1,3-dithietane*

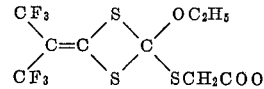

Bis(trifluoromethyl)thioketene was added to an equimolar amount of carboxymethyl ethylxanthate,

(E. Biilmann, Ann. 339, 355 (1905)). The liquid crystallized after a short time and the solid was purified by dissolving it in sodium bicarbonate solution, filtering the solution, and reprecipitating the product with hydrochloric acid. The precipitated compound was filtered off, washed with water, air-dried, and recrystallized from cyclohexane. This gave a 50% yield of the white dithietane, M.P. 88.3–90° C.

*Analysis.*—Calc'd. for C₉H₈F₆O₃S₃: C, 28.97; H, 2.15; S, 25.70. Found: C, 29.04; H, 2.32; S, 25.74.

The foregoing detailed examples illustrate the preparation of specific products of this invention. Application of the described procedure, as in Examples 1 and 5, to other trithiocarbonates; as in Examples 2 and 3, to other thionocarbonates; as in Examples 4 and 7, to other xanthates; as in Example 6, to other dithioesters or thionoesters, yields in a similar manner other 4-hexafluoroisopropylidene-1,3-dithietanes of the structure defined in the general formula previously set forth. Additional examples of specific products of this invention are given in the table below. The first column lists by name the thiocarbonyl compound reacted with the bis(trifluoromethyl) thioketene, under subheadings naming the general type of thiocarbonyl reactant. Opposite each name, the second column shows the formula of the radicals R and R', or of the radical R+R', as the case may be, in the resulting reaction product, under structural subheadings indicating the type formula of the product. All of these reaction products, of course, are within the general formula

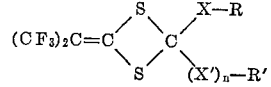

where X, X', *n*, R and R' have the previously stated significance.

TABLE

| Starting Material | R and R' in Reaction Product |
|---|---|
| (I) Trithiocarbonate | (I) $(CF_3)_2C=C\begin{smallmatrix}S\\ \\S\end{smallmatrix}C\begin{smallmatrix}S-R\\ \\S-R'\end{smallmatrix}$ |
| Dimethyl | $R=R'=CH_3-$ |
| Diisobutyl | $R=R'=(CH_3)_2CHCH_2-$ |
| Ethyl, dodecyl | $R=C_2H_5-$, $R'=CH_3(CH_2)_{11}-$ |
| Diallyl | $R=R'=CH_2=CHCH_2-$ |
| Dicyclohexyl | $R=R'=H_2C\begin{smallmatrix}CH_2-CH_2\\ \\CH_2-CH_2\end{smallmatrix}CH-$ |
| Trimethylene | $R+R'=H_2C\begin{smallmatrix}CH_2-\\ \\CH_2-\end{smallmatrix}$ |
| Diphenyl | $R=R'=C_6H_5-$ |
| Dibenzyl | $R=R'=C_6H_5CH_2-$ |
| Tert-butyl, benzyl | $R=(CH_3)_3C-$, $R'=C_6H_5CH_2-$ |
| (II) Thionocarbonate | (II) $(CF_3)_2C=C\begin{smallmatrix}S\\ \\S\end{smallmatrix}C\begin{smallmatrix}O-R\\ \\O-R'\end{smallmatrix}$ |
| Diethyl | $R=R'=C_2H_5-$ |
| Tetramethylene | $R+R'=H_2C-CH_2-$ <br> $H_2C-CH_2-$ |
| Bis(2-naphthyl) | $R=R'=$ 2-naphthyl |
| 2-naphthyl phenyl | $R=$ 2-naphthyl, $R'=C_6H_5-$ |
| Bis(p-chlorophenyl) | $R=R'=Cl-C_6H_4-$ |
| Bis(2,4-dichlorophenyl) | $R=R'=Cl-C_6H_3(Cl)-$ |
| Bis(p-methoxyphenyl) | $R=R'=CH_3O-C_6H_4-$ |
| Bis(p-nitrophenyl) | $R=R'=O_2N-C_6H_4-$ |
| Ditolyl | $R=R'=CH_3-C_6H_4-$ |
| o-Phenylene thionocarbonate | $R+R'=$ o-phenylene |

| Starting Material | R and R' in Reaction Product |
|---|---|
| (III) Xanthate | (III) $(CF_3)_2C=C\begin{smallmatrix}S\\ \\S\end{smallmatrix}C\begin{smallmatrix}OR\\ \\SR'\end{smallmatrix}$ |
| Methyl ethyl | R=CH$_3$—, R'=C$_2$H$_5$— |
| Tert-butyl, propyl | R=(CH$_3$)$_3$C—, R'=CH$_3$CH$_2$CH$_2$— |
| Octadecyl methyl | R=CH$_3$(CH$_2$)$_{17}$—, R'=CH$_3$— |
| Dioctadecyl | R=R'=CH$_3$(CH$_2$)$_{17}$— |
| Diallyl | R=R'=CH$_2$=CH—CH$_2$ |
| Ethyl cyclohexyl | R=C$_2$H$_5$—, R'=H$_2$C$\begin{smallmatrix}CH_2-CH_2\\ \\CH_2-CH_2\end{smallmatrix}$CH— |
| Menthyl methyl | R=H$_2$C$\begin{smallmatrix}CH_3\\CH-CH_2\\ \\CH_2-CH\\CH(CH_3)_2\end{smallmatrix}$CH—, R'=CH$_3$— |
| Ethyl 10-carboxydecyl | R=C$_2$H$_5$—, R'=HOOC—(CH$_2$)$_{10}$— |
| Ethyl phenethyl | R=C$_2$H$_5$—, R'=C$_6$H$_5$CH$_2$CH$_2$— |
| Diphenyl | R=R'=C$_6$H$_5$— |
| p-Tolyl benzyl | R=CH$_3$—⟨C$_6$H$_4$⟩—, R'=C$_6$H$_5$CH$_2$— |
| p-Methoxyphenyl benzyl | R=CH$_3$O—⟨C$_6$H$_4$⟩—, R'=C$_6$H$_5$CH$_2$— |
| 1,3-benzoxathiole-2-thione | R+R'=⟨C$_6$H$_4$⟩ |
| (IV) Dithioesters | (IV) $(CF_3)_2C=C\begin{smallmatrix}S\\ \\S\end{smallmatrix}C\begin{smallmatrix}SR\\ \\R'\end{smallmatrix}$ |
| Dimethyl | R=R'=CH$_3$— |
| Isobutyl methyl | R=(CH$_3$)$_2$CHCH$_2$—, R'=CH$_3$ |
| Propyl cyclohexyl | R=CH$_3$CH$_2$CH$_2$—, R'=H$_2$C$\begin{smallmatrix}CH_2-CH_2\\ \\CH_2-CH_2\end{smallmatrix}$CH— |
| Methyl phenyl | R=CH$_3$—, R'=C$_6$H$_5$— |
| Methyl naphthyl | R=CH$_3$—, R'=C$_{10}$H$_7$— |
| Butyl p-tolyl | R=CH$_3$(CH$_2$)$_3$—, R'=CH$_3$—⟨C$_6$H$_4$⟩— |
| p-Nitrobenzyl p-tolyl | R=NO$_2$—⟨C$_6$H$_4$⟩—CH$_2$—, R'=CH$_3$—⟨C$_6$H$_4$⟩— |
| (V) Thionesters | (V) $(CF_3)_2C=C\begin{smallmatrix}S\\ \\S\end{smallmatrix}C\begin{smallmatrix}OR\\ \\R'\end{smallmatrix}$ |
| Diethyl | R=R'=C$_2$H$_5$— |
| Methyl octyl | R=CH$_3$—R'=CH$_3$(CH$_2$)$_7$— |
| Methyl cyclohexyl | R=CH$_3$—, R'=H$_2$C$\begin{smallmatrix}CH_2-CH_2\\ \\CH_2-CH_2\end{smallmatrix}$CH— |

| Starting Material | R and R' in Reaction Product |
|---|---|
| Isobutyl phenyl | R=(CH₃)₂CHCH₂—, R'=C₆H₅— |
| Ethyl naphthyl | R=C₂H₅—, R'=C₁₀H₇— |
| Dibenzyl | R=R'=C₆H₅CH₂— |
| Propyl p-tolyl | R=CH₃CH₂CH₂—, R'=CH₃—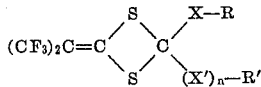— |

The compounds of this invention are useful as textile-treating agents, particularly for waterproofing wool. Pieces of wool fabric were placed in one percent solutions of Examples 1, 2, 4, and 5 and the solution was refluxed for thirty minutes. The fabric was then removed, washed with benzene, and allowed to dry. Water drops placed on the treated fabric remained indefinitely, usually until they evaporated, showing that the wool had been rendered water-repellent. Drops placed on untreated wool, or wool boiled in benzene alone, were quickly absorbed. The same result was obtained with Examples 3 and 6 when toluene was used in place of benzene to permit a higher treating temperature.

Since obvious modifications and equivalents in the invention will be evident to those skilled in the chemical arts, I propose to be bound solely by the appended claims.

The embodiments of the invention in which an exclusive property or privilege is claimed are defined as follows.

I claim:

1. A compound of the formula $$(CF_3)_2C=C\begin{smallmatrix}S\\\\S\end{smallmatrix}C\begin{smallmatrix}X-R\\\\(X')_n-R'\end{smallmatrix}$$

wherein:
X and X' are selected from the group consisting of oxygen and sulfur;
n is an integer from 0 to 1; and
R and R' are selected from the group consisting of alkyl, alkenyl and carboxyalkyl of up to 18 carbons; cycloalkyl of 5 to 6 ring carbons; aralkyl of 7 to 8 carbons;
1- to 2-ring aryl having 0 to 2 substituents selected from the group consisting of halogen, lower alkyl, lower alkoxy and nitro;
alkylene forming a 5- to 7-membered ring with the heteroatoms and the dithietane carbon; and
o-phenylene.

2. 2 - [2,2,2 - trifluoro-1-(trifluoromethyl)ethylidene]-1,3,5,8-tetrathiospiro[3.4]octane.

3. 2,2 - dimethoxy - 4-[2,2,2-trifluoro-1-(trifluoromethyl)ethylidene]-1,3-dithietane.

4. 2,2 - diphenoxy - 4-[2,2,2-trifluoro-1-(trifluoromethyl)ethylidene]-1,3-dithietane.

5. 2 - methoxy - 2 - methylthio-4-[2,2,2-trifluoro-1-(trifluoromethyl)ethylidene]-1,3-dithietane.

6. 4' - [2,2,2 - trifluoro-1-(trifluoromethyl)-ethylidene] spiro[1,3-benzodithiole-2,2'[1,3]dithietane].

7. 2 - ethylthio - 2-methyl - 4 - [2,2,2 - trifluoro - 1-(trifluoromethyl)ethylidene]-1,3-dithietane.

8. 2 - (carboxymethylthio)-2-ethoxy-4-[2,2,2-trifluoro-1-(trifluoromethyl)ethylidene]-1,3-dithietane.

9. The process which comprises reacting, at a temperature in the range of —20 to 50° C., bis(trifluoromethyl)thioketene with a thiocarbonyl compound of the formula $$S=C\begin{smallmatrix}X-R\\\\(X')_n-R'\end{smallmatrix}$$

wherein:
X and X' are selected from the group consisting of oxygen and sulfur;
n is an integer from 0 to 1; and
R and R' are selected from the group consisting of alkyl, alkenyl and carboxyalkyl of up to 18 carbons; cycloalkyl of 5 to 6 ring carbons; aralkyl of 7 to 8 carbons;
1- to 2-ring aryl having 0 to 2 substituents selected from the group consisting of halogen, lower alkyl, lower alkoxy and nitro;
alkylene forming a 5- to 7-membered ring with the heteroatoms and the dithietene carbon; and
o-phenylene.

10. The process which comprises reacting, at a temperature in the range of —20 to 50° C., bis(trifluoromethyl)thioketene with ethylene trithiocarbonate.

11. The process which comprises reacting, at a temperature in the range of —20 to 50° C., bis(trifluoromethyl)thioketene with dimethyl thionocarbonate.

12. The process which comprises reacting, at a temperature in the range of —20 to 50° C., bis(trifluoromethyl)thioketene with diphenyl thionocarbonate.

13. The process which comprises reacting, at a temperature in the range of —20 to 50° C., bis(trifluoromethyl)thioketene with methyl methylxanthate.

14. The process which comprises reacting, at a temperature in the range of —20 to 50° C., bis(trifluoromethyl)thioketene with o-phenylene trithiocarbonate.

15. The process which comprises reacting, at a temperature in the range of —20 to 50° C., bis(trifluoromethyl)thioketene with ethyl dithioacetate.

16. The process which comprises reacting, at a temperature in the range of —20 to 50° C., bis(trifluoromethyl)thioketene with carboxymethyl ethylxanthate.

References Cited

UNITED STATES PATENTS 2,970,173  1/1961  Howard et al. _____ 260—327

OTHER REFERENCES

Autenreith Berichte, vol. 20 (1887), page 374.
Schonberg et al. Berichte, vol. 64 (1931), pages 2582–2584.
Wislicenus Zeif. fur Chemie (1869), page 224.

WALTER A. MODANCE, *Primary Examiner.*

JAMES A. PATTEN, *Assistant Examiner.*